March 19, 1963 R. M. SHERMAN 3,081,944
APPARATUS FOR CONTROLLING FURNACE TEMPERATURES
Filed Aug. 6, 1957 2 Sheets-Sheet 2
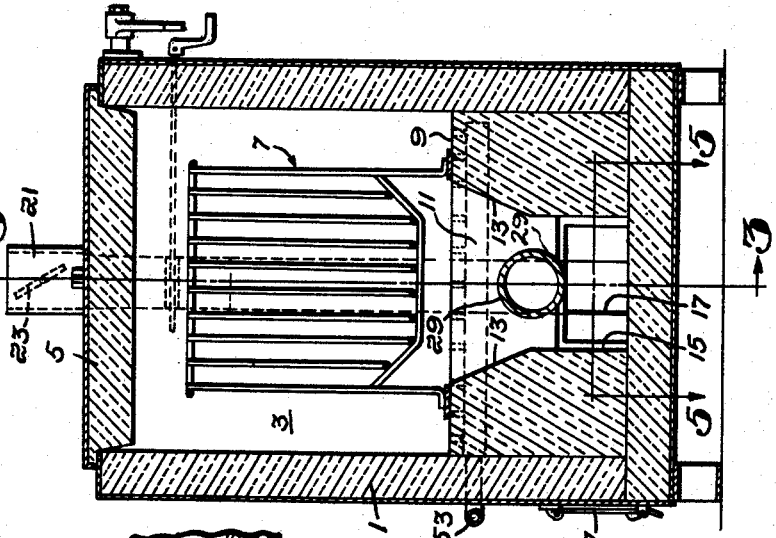
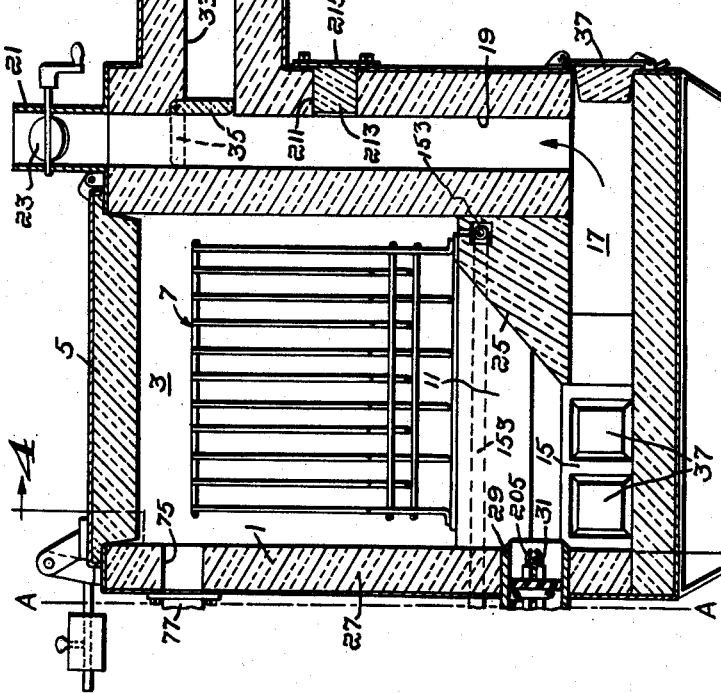
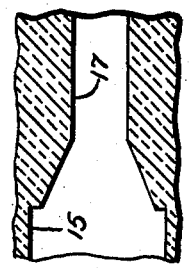
Inventor:
Ralston M. Sherman,
by Emery Booth Townsend Miller &
Weidner Attorneys United States Patent Office 3,081,944
Patented Mar. 19, 1963

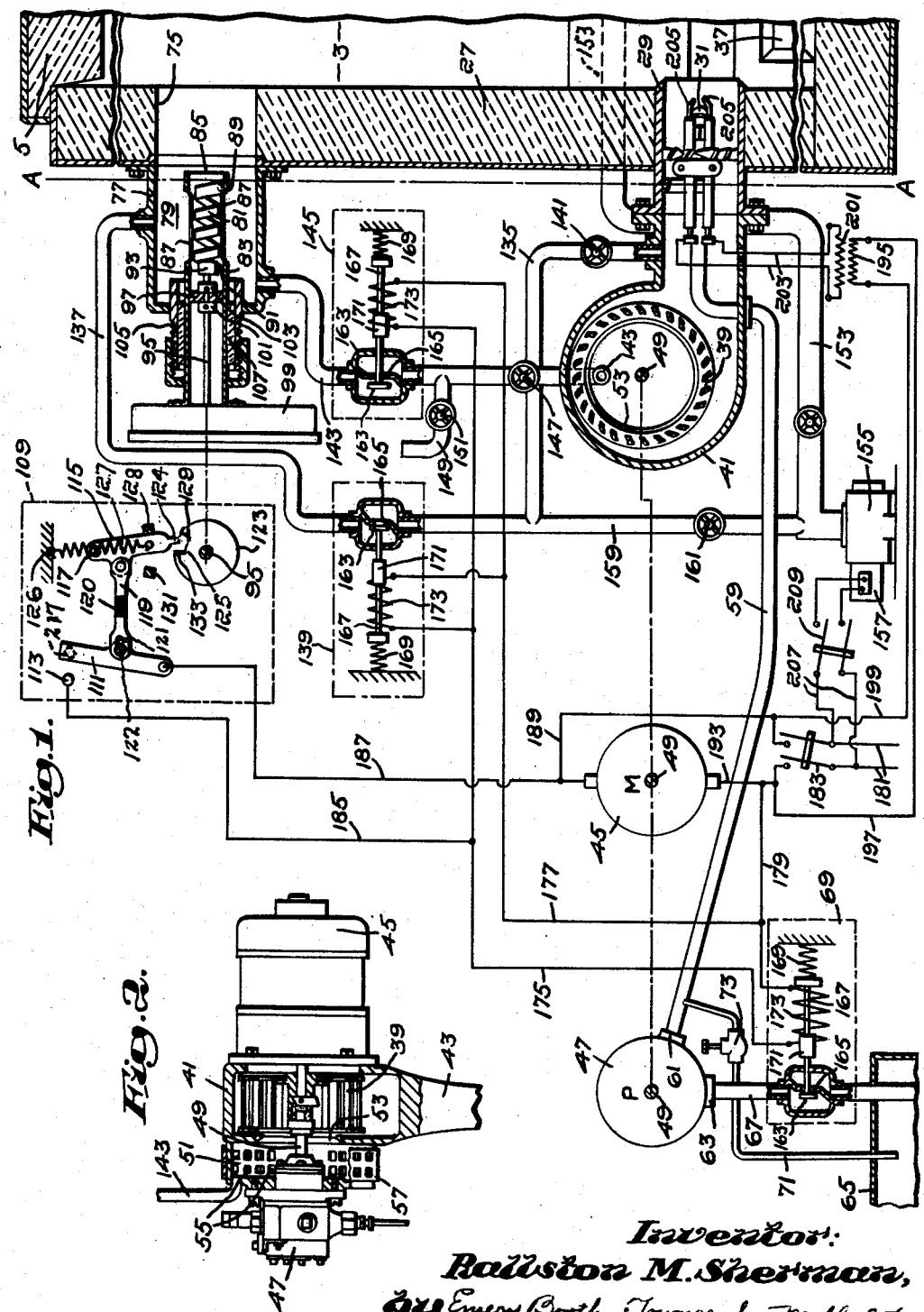

3,081,944
APPARATUS FOR CONTROLLING FURNACE
TEMPERATURES
Rallston M. Sherman, Glastonbury, Conn., assignor to
The Silent Glow Oil Burner Corporation, Hartford,
Conn., a corporation of Connecticut
Filed Aug. 6, 1957, Ser. No. 676,523
10 Claims. (Cl. 236—15)

My invention relates to thermostatically controlling the temperature at a selected point in the interior of a furnace or the like by controlling the amount of heating energy supplied the furnace.

Heretofore it has been proposed in operating furnaces at high temperature to place the thermostat for controlling the supply of heating energy to the furnace in a chamber at the exterior of the furnace opening into its interior so as to have the thermostat positioned out of direct contact with the hot furnace gases in order to prevent its being damaged or destroyed by the heat of such gases particularly when they become excessively heated for a short period under untoward conditions in the furnace. Because such chamber opens into the interior of the furnace the thermostat is subjected to the heat of the furnace, but does not heat up or cool down as quickly as the furnace gases, with the result that such arrangement commonly proves unsatisfactory in that it fails to maintain the temperature at the selected point in the interior of the furnace anywhere near a desired predetermined value. For example, applicant has found that with such an arrangement applied to an oil fired incinerating furnace wherein it is desired to maintain the temperature of the charging chamber at 1400° F. the temperature will sometimes rise to a maximum of about 1500° F., and fall to a minimum of about 1325° F., because of the relatively slow heating up of the thermostat when the temperature in such charging chamber rises to above 1400° F. and the relatively slow cooling down of the thermostat when the temperature in such charging chamber falls to below 1400° F.

It is an object of the present invention to cure the defects of the above mentioned arrangement, while retaining its advantages, so as to prevent a wide fluctuation of the temperature at the point in the interior of the furnace where the temperature is to be maintained substantially constant at a predetermined value.

According to the present invention, the thermostat controls means for interrupting a supply of heating energy to the furnace when the temperature in the interior of the furnace rises to a predetermined value, and establishes such supply when the temperature falls to that value. Simultaneously with the thermostat causing the heating energy to be interrupted it causes a cooling medium to flow into the chamber containing the thermostat for cooling the latter at such rate that it will be just about ready to cause reestablishment of the supply of heating energy when the temperature in the interior of the furnace at the point therein where the temperature is to be controlled falls to such predetermined value, with the result that such temperature will not fall very much below that value, the thermostat causing such supply of cooling medium to the chamber to be interrupted upon the thermostat causing reestablishment of such supply of heating energy. This expedient in many instances proves entirely satisfactory in maintaining the temperature at or above the selected predetermined value below which it is not to fall, and is particularly useful when it is important only that such a temperature condition be maintained. It will be understood that in absence of such expedient the temperature in the furnace would fall to well below such value before the thermostat became cool enough to reestablish the supply of heating energy. Applicant has found that, by use of such expedient applied to a furnace in which the temperature is to be maintained not materially below 1400° F. at the selected point therein, by properly adjusting the supply of cooling medium to the chamber containing the thermostat such temperature will not fall to less than about 1395° F.

According to the present invention, when it is important that the temperature at the selected point in the interior of the furnace shall not rise materially above a selected predetermined value, the thermostat when it establishes a supply of heating energy to the furnace simultaneously causes a flow of hot gases from such point in the furnace through the chamber containing the thermostat to heat up the thermostat quickly so that the thermostat will be about ready to operate to interrupt such supply of energy when the temperature at such point reaches the predetermined value, with the result that the temperature in the furnace at such point will not rise much above that value before the thermostat interrupts said supply of energy. In absence of this last mentioned expedient it will be understood that the temperature would rise well above the predetermined value before the thermostat heated sufficiently to cause the supply of heating energy to be interrupted. It will be observed that such expedient is particularly useful in cases where the furnace is initially placed in operation in a cold condition.

Both of the above expedients may be employed in a given installation so that the cooling medium flows into the chamber containing the thermostat for cooling the thermostat when the supply of heating energy to the furnace is interrupted, and so that the hot furnace gases are drawn through such chamber when the supply of heating energy is established, the flow of cooling medium being interrupted when the furnace gases are caused to flow through the chamber, and vice versa. For example, applicant has found that by employing both expedients in connection with an incinerating furnace in which the temperature of the charging chamber is to be maintained nominally at 1400° F. such temperature will not fall below about 1395° F. or rise above about 1405° F.

The furnace employed may be of any suitable kind, such as one supplied with heating energy in the form of a combustible mixture of air with atomized fuel oil or with fuel gas, or in an electric furnace in the form of an electric current.

The cooling medium supplied the chamber containing the thermostat may be relatively cool atmospheric air, or an inert gas such as nitrogen, or a water spray, or the like, depending upon the kind of furnace employed, an inert gas preferably being used in connection with an electric furnace.

Herein, and in the appended claims, by reference to the "interior" of the furnace are included the chambers, flues and passages of the furnace through which the hot furnace gases and vapors flow, and the chambers, flues and passages into which the furnace may discharge hot furnace gases and vapors for disposal of them or utilization of their heat, as the temperature in all such chambers, flues and passages is dependent upon the supply of heating energy to the furnace controlled by the thermostat.

The invention will be further understood from the following description when read in the light of the accompanying drawings of a specific embodiment of the invention selected for illustrative purposes, while the scope of the invention will be more particularly pointed out in the appended claims.

In the drawings:

FIG. 1 is a combined flow diagram and wiring diagram according to the invention;

FIG. 2 shows a detail of the electric motor, blower and pump employed in the diagram according to FIG. 1;

FIG. 3 is a section on the line 3—3 of FIG. 4 of a furnace employed in connection with the diagram shown by FIG. 1, the parts at the right of the line A—A of FIG. 3 being a continuation of the parts at the right of the line A—A of FIG. 1;

FIG. 4 is a section on the line 4—4 of FIG. 3; and

FIG. 5 is a section on the line 5—5 of FIG. 4.

The furnace shown by FIGS. 3, 4 and 5 forms no part of the present invention, and is illustrated merely as an example of showing how the present invention may be applied to a furnace, and therefore will be described with no more particularity than necessary to explain such invention.

As shown, the furnace comprises a casing 1 having a charging chamber 3 provided with a hinged cover 5, in which chamber is contained a removable openwork basket 7 supported on the floor 9 of such chamber. From such floor extends downwardly a passage 11 having the laterally converging walls 13, which passage opens into a trough-like passage 15 at the bottom of the furnace extending part way its length and communicating with a passage 17 opening into a vertical flue 19 communicating with a stack 21 provided with an adjustable damper 23. The wall 25 at the right hand end of the passage 11 is upwardly inclined away from the end wall 27 of the furnace. Through said end wall 27 extends a blast tube 29 of a gun type oil burner having an oil atomizing nozzle 31, the blast being projected against the inclined wall 25 and deflected upwardly into the charging chamber 3 where it passes through and about the basket 7 containing the material to be incinerated. The gaseous products of the blast mixed with the gaseous products of the material being incinerated descend through the passage 11 to contact the heated walls 13 of said passage and the blast of flame projected from the blast tube so as to burn any smoke producing particles which may be contained in such mixture and the odoriferous constituents of such mixture. A fraction of such descending gaseous products is entrained by the blast and recirculated through the charging chamber 3, the remaining fraction passing around the blast in contact therewith and entering the trough-like passage 15 whence it discharges through the passage 17 into the flue 19.

As shown, opening into the flue 19 is a branch flue 33, a damper or valve 35 being provided for causing the products ascending the flue 19 to pass into the stack 21 when the damper 35 is in its full line position shown by FIG. 3, and to pass into the branch flue 33 when it is in its dotted line position shown by said figure. The branch flue 33 may lead to other apparatus, such as a drier, for availing of the heat of the furnace gases, in which connection it is mentioned that the furnace may be employed without charging to it material to be incinerated so as merely to serve as a generator of hot gases.

The ash from the basket 7 falls downwardly through the passage 11 into the passage 15, from which latter it may be removed through the normally closed cleanout doors 37.

The oil burner for supplying the mixture of combustion air and atomized oil to the furnace may be of known construction comprising a blower rotor 39 contained in a casing 41 carried by a suitable support 43, which latter may rest upon the floor or any convenient place for supporting the blower. Carried by the casing at one side thereof is shown an electric motor 45, while at the opposite side thereof it carries an oil pump 47, the motor shaft 49 being directly connected to and driving the rotor and pump.

As shown, the blower casing 41 is provided with an air inlet chamber 51 communicating with the interior of the blower rotor through an opening 53, air being admitted to said air inlet chamber through the apertures 55 in its circumferential wall, the effective size of which apertures is shown to be adjusted by the adjustably rotatable apertured sleeve 57 extending circumferentially about said chamber. As diagrammatically shown in FIG. 1, the blast tube 29 is connected to the blower rotor casing 41 so that the blower rotor forces a blast of air through that tube into the furnace, which blast mixes with the atomized oil discharged from the nozzle 31.

The nozzle 31, as shown by FIG. 1, is connected by a pipe 59 to the oil discharge outlet 61 of the oil pump 47. The pump oil intake 63 is supplied with oil from a tank 65 through a pipe 67 in which is positioned a normally open solenoid valve 69. Leading from the pipe 59 back to the oil tank 65 is shown a pipe 71 in which is positioned an adjustable pressure relief valve 73 which automatically more or less opens to discharge oil from the pipe 59 back to the oil tank when the pressure in the pipe 59 exceeds a selected predetermined maximum value, in that way to maintain a constant pressure of the oil supplied the oil burner nozzle.

As shown, the wall 27 of the charging chamber 3 of the furnace is provided with a through opening 75, and secured to such wall at the exterior of said chamber in alignment with such opening is a member 77 the walls of which form a generally cylindrical chamber 79 in which is positioned the heat sensitive element 81 of a thermostatic switch. As shown, this heat sensitive element comprises a coil of ribbon of metal of high thermal heat expansibility positioned in a tube 83, which tube has an open end 85 and longitudinally extending openings 87 opposite the coil so that the latter will be subjected to the heat of the gases within the chamber 79. As illustrated, one end of the coil is riveted to the tube as indicated at 89, while its opposite end is fixedly secured by a screw 91 to a block 93 on the end of a shaft 95 rotatably mounted in a partition 97 fixedly positioned within the tube, the shaft extending into the casing 99 carried by the outer end of the tube. Longitudinal movement of the shaft 95 in either of opposite directions is prevented by the collars 101 and 103 fixedly carried by the shaft and rotatably bearing against opposite sides of the partition 97. When the ribbon of the coil constituting the heat sensitive element is heated to cause it to expand linearly such expansion will cause the coil to rotate the shaft 95 in one direction, and when such ribbon cools and contracts linearly will cause the coil to rotate that shaft in the opposite direction. As shown, the tube is inserted into the chamber 79 through an opening 105 in the outer end of the member 77, and between the walls of which opening and the tube is positioned a packing ring 107 of heat refractory material such as asbestos.

The casing 99 carried by the outer end of the tube 83 of the thermostatic switch contains the switch element of such switch. This switch element is diagrammatically indicated by the switch element 109 (FIG. 1) operated by rotation of the shaft 95 in opposite directions. Such switch element may constitute a snap switch of any suitable sort. As diagrammatically shown, it comprises a swingable switch blade 111 adapted to be moved on and off a stationary contact 113. The switch blade is shown as operated by a swingable lever 115 pivotally supported at 117, this lever being connected to the switch blade by a link 119 having an insertion 120 of insulating material, the link having a lost motion connection to such blade afforded by the slot 121 in the link and a pin 122 carried by the blade and received in such slot. The lever is swung on its pivot by a disc 123 fixedly carried by the shaft 95, the lever at its lower end having a projection 124 extending into a notch 125 formed on the periphery of the disc. Attached at its lower end to the lever, and at its upper end to a stationary part 126 of the device, is a tension spring 127, which spring when the parts are in their positions shown by FIG. 1 holds the lever against a stationary stop 128. When the heat sensitive coil 81 is heated to rotate the disc 123 counterclockwise, as viewed in FIG. 1, the end wall 129 of the notch 125 will engage the projection 124 of the lever 115 to swing the lever to the left as viewed in FIG. 1. Such swinging of the lever will first take up the lost motion of the connection between the link 119 and switch blade 111 to cause the pin 122 to lie against the right hand end of the slot 121, and as soon as the spring 127 passes to the left just over the axis of swinging of the lever it will snap the lever against the stationary stop 131 and swing the switch blade 111 to place it on the contact 113. When the heat sensitive coil is cooled to rotate the disc in the opposite direction, with the lever 115 against the stop 131, the end wall 133 of the notch 125 will engage the projection 124 of the lever and swing the lever to the right to take up the lost motion in the opposite direction so as to cause the pin to bear against the left hand end of the slot, whereupon the spring 127 when it passes to the right just over the axis of swinging of the lever will snap the lever to the right to bring it against the stop 128 thereby to place the parts again in their positions shown by FIG. 1.

As diagrammatically illustrated, leading from the blast tube 29 is a pipe connection, comprising the pipes 135 and 137, opening into the chamber 79 containing the heat sensitive element of the thermostatic switch. In this pipe connection is positioned the normally closed solenoid valve 139 which when opened permits cooling fluid in the form of atmospheric air from the blast tube to discharge into said chamber against said heat sensitive element for cooling it. For regulating the amount of air passing through this pipe connection the pipe 135 is shown as provided with a manually operated valve 141 which may be more or less opened to effect such regulation.

Connecting the outermost end of the chamber 79 containing the heat sensitive element of the thermostatic switch to the air inlet chamber 51 of the oil burner blower is shown a pipe 143 in which is positioned the normally open solenoid valve 145. This pipe acts to exhaust the chamber 79 so as to draw into it, by way of the opening 75 in the furnace wall, hot furnace gases and discharge such gases from the chamber by way of said pipe. As shown, the pipe is provided with a manually operated valve 147 which may be more or less opened to regulate the amount of furnace gases flowing through the chamber.

Connected to the pipe 143 at a point between the solenoid valve 145 and the manually operated valve 147 is shown a branch pipe 149 opening into the atmosphere, this branch pipe being provided with a manually operated valve 151 for regulating the flow through said branch pipe. When the pressure in the interior of the furnace is sufficiently above atmospheric the manually operated valve 147 may be completely closed and the valve 151 opened to cause such gases to flow through the chamber 79 and discharge therefrom by way of the pipe 143 and branch pipe 149. When the pipe 143 is to be operatively connected to the air inlet chamber of the oil burner blower the valve 151 will be completely closed and the valve 147 more or less open.

In the furnace illustrated by FIGS. 3, 4 and 5 provision is made for supplying it with auxiliary combustion air by way of a pipe 153 leading from an air blower 155 driven by an electric motor 157. When this auxiliary blower is provided the pipe connection 135, 137 may be connected to the pipe 153 by the pipe 159 for supplying the cooling medium to the chamber 79 from the auxiliary blower, instead of from the blast tube 29. When the cooling medium is to be supplied from the blast tube the manually operated valve 141 will be more or less open and the manually operated valve 161 in the pipe 159 completely closed, and when the cooling medium is to be supplied from the air blower 155 the valve 161 will be more or less open and the valve 141 completely closed.

The solenoid valves 69, 139 and 145 diagrammatically illustrated each comprises a valve element 163 cooperating with a valve seat 165, the valve having a stem 167 operated upon by a compression spring 169 which normally holds the solenoid valves 69 and 145 in open position and the solenoid valve 139 in closed position. Carried by the valve stem in each instance is an armature 171 with which a solenoid coil 173 cooperates. As shown, when the solenoid coil of the solenoid valve 139 is energized it will move the valve element of that valve away from its seat to open that valve, and when it is deenergized the spring 169 of the valve will close the valve. When the solenoid coils of the solenoid valves 69 and 145 are energized they will close those valves, and when they are deenergized the springs of those valves will open them.

As shown, the solenoid coils of the three solenoid valves are connected in parallel by the leads 175 and 177, the lead 177 being connected by a lead 179 to one side of the line 181 when the manually operated switch 183 is closed, while the other lead 175 is adapted to be connected by the leads 185, 187 and 189 through the thermostatic switch to the other side of the line when said manually operated switch is closed. The oil burner motor 45 is shown as connected across the line by the leads 189 and 193 when the manually operated switch 183 is closed. Closure of the manually operated switch connects the primary winding 195 of the ignition transformer across the line through the leads 197 and 199, the secondary winding 201 of the transformer being connected by the leads 203 to the spark ignition electrodes 205 so that there will be a continuous spark at the nozzle 31 for igniting the atomized oil issuing therefrom immediately upon closure of the solenoid valve 69 in the oil supply pipe 67 of the oil pump when the oil burner is in operation. The motor 157 for the auxiliary air blower 155 is shown as connected across the line by the leads 207 when the manually operated switch 209 is closed.

It will be understood that with the apparatus described after the furnace heats up normally the solenoid valve in the oil supply pipe will be closed but for a few seconds. More effective results are secured by interrupting the supply of oil than by interrupting the operation of the oil burner motor because of the fan and pump being continuously driven. Further, the supply of air to the blast during the period in which the supply of oil to the pump is interrupted has a beneficial effect as it acts to cool the furnace, it being observed that such supply of oil is interrupted only when the temperature in the furnace rises to above the predetermined value to be maintained therein.

It will also be understood that, although the chamber 79 containing the heat sensitive element 81 of the thermostat is shown as communicating with the interior of the charging chamber of the furnace through the opening 75 for controlling the temperature in the charging chamber at the point therein with which such opening communicates, the chamber 79 may communicate with the interior of the furnace at any of other selected points. For example, the furnace may be provided with an opening 211 communicating with the flue 19, which opening is shown as closed by a removable plug 213 and a removable plate 215. By removing this plug and plate the member 77 forming the chamber 79 may be substituted for them and the opening 75 closed by said plate and plug, under which conditions the thermostatic switch will control the temperature in the flue at the point therein where the opening 211 communicates with it.

Likewise it will be understood that, although as illustrated in FIG. 1 the normally open solenoid valve 69 is positioned in the suction pipe 67 of the oil pump 47, it equally as well can be positioned instead in the pump discharge pipe 59, say between the nozzle 31 and the connection to that pipe of the pipe 71, depending on the type of pump employed. Also it will be understood that the three solenoid valves 69, 139 and 145 may be so constructed that their springs 169 hold normally open those which are shown in FIG. 1 as closed and hold normally closed those which are shown in FIG. 1 as open, that is to say, have the valves 69 and 145 each like the valve 139 and vice versa, in which case the thermostatic switch will be connected to the controlling circuit for the solenoid coils 173 of such valves in such way as normally to energize them so as to hold the valves in their open and closed positions shown in FIG. 1, say by connecting the lead 185 to the contact 217, on which the switch blade 111 normally rests, instead of to the contact 113.

It will be further understood that within the scope of the appended claims wide deviations may be made from the forms of the invention herein described without departing from the spirit of the invention.

I claim:

1. The combination with a furnace or the like having means for supplying it with a blast of ignited mixture of oil and combustion air from an oil burner which means includes a blower for such air and a pump for such oil and an electric motor for driving said blower and pump, of means for controlling the temperature of the interior of said furnace comprising walls forming a chamber at the exterior of the furnace in fluid communication with its interior, a thermostatic switch having its heat sensitive element positioned within said chamber, said pump having an oil supply pipe and an oil discharge pipe for the oil supplied said blast, a normally open solenoid valve in one of said pipes, said blower having an air inlet side and an air discharge side for the air supplied said blast, a pipe connection leading from the air discharge side of said blower to said chamber, a normally closed solenoid valve in said pipe connection; and circuit means controlled by said switch, when said motor is operating to drive said blower and pump, for operating said solenoid valves to close the first mentioned of them and open the second mentioned of them when said switch operates in response to a rise in such temperature to above a predetermined value and to open said first mentioned valve and close said second mentioned valve when said switch operates in response to a fall in such temperature to below that value.

2. The combination according to claim 1 in which there is provided a pipe connection between the chamber containing the heat sensitive element of the thermostat and the air inlet side of the blower, a third and normally open solenoid valve in said pipe connection, the circuit means controlled by the switch operating said third solenoid valve to close it when said switch operates the first and second mentioned solenoid valves to close said first mentioned and open said second mentioned, and to open said third solenoid valve when said switch operates said first and second mentioned solenoid valves to open said first mentioned and close said second mentioned.

3. The combination according to claim 1 in which the interior of the furnace is above atmospheric pressure and there is a discharge opening to the atmosphere from the chamber containing the heat sensitive element of the thermostatic switch, a third and normally open solenoid valve for controlling the discharge through such opening, the circuit means controlled by the switch operating said third solenoid valve to close it when said switch operates the first and second mentioned solenoid valves to close said first mentioned and open said second mentioned, and to open said third solenoid valve when said switch operates said first and second mentioned solenoid valves to open said first mentioned and close said second mentioned.

4. The combination with a furnace or the like having means for supplying it with a blast of ignited mixture of oil and combustion air from an oil burner which means includes a blower for such air and a pump for such oil and an electric motor for driving said blower and pump, of means for controlling the temperature of the interior of said furnace comprising walls forming a chamber at the exterior of the furnace in fluid communication with its interior, a thermostatic switch having its heat sensitive element positioned within said chamber, said pump having an oil supply pipe and an oil discharge pipe for the oil supplied said blast, a normally open solenoid valve in one of said pipes, a second blower for supplying auxiliary air to the furnace, an electric motor for driving said second blower, which second blower has an air inlet side and an air discharge side, a pipe connection leading from the air discharge side of said second blower to said chamber, a normally closed solenoid valve in said pipe connection; and circuit means controlled by said switch, when both the oil burner blower and said second blower are being driven by their motors, for operating said solenoid valves to close the first mentioned of them and open the second mentioned of them when said switch operates in response to a rise in such temperature to above a predetermined value and to open said first mentioned valve and close said second mentioned valve when said switch operates in response to a fall in such temperature to below that value.

5. The combination according to claim 4 in which there is provided a pipe connection between the chamber containing the heat sensitive element of the thermostat and the air inlet side of the oil burner blower, a third and normally open solenoid valve in said pipe connection, the circuit means controlled by the switch operating said third solenoid valve to close it when said switch operates the first and second mentioned solenoid valves to close said first mentioned and open said second mentioned, and to open said third solenoid valve when said switch operates said first and second mentioned solenoid valves to open said first mentioned and close said second mentioned.

6. The combination according to claim 4 in which the interior of the furnace is above atmospheric pressure and there is operatively a discharge opening to the atmosphere from the chamber containing the heat sensitive element of the thermostatic switch, a third and normally open solenoid valve for controlling the discharge through such opening, the circuit means controlled by the switch operating said third solenoid valve to close it when said switch operates the first and second mentioned solenoid valves to close said first mentioned and open said second mentioned, and to open said third solenoid valve when said switch operates said first and second mentioned solenoid valves to open said first mentioned and close said second mentioned.

7. The combination with a furnace having means for supplying it with heating energy from an exterior source of supply, of automatically operating means for interrupting such supply upon the furnace temperature rising to above a predetermined value and for establishing such supply upon such temperature falling to below that value; the last mentioned means comprising a thermostat, having a heat sensitive element operatively positioned at the exterior of the furnace, for controlling such means to cause it so to operate; and means for automatically causing a flow of hot furnace gases from the interior of the furnace for heating said heat sensitive element when the furnace temperature is below said predetermined value and said supply of heating energy is so established and for automatically discontinuing such flow and causing a flow of cooling medium for cooling said element when the furnace temperature is above said value and the supply of heating energy is so interrupted.

8. The combination according to claim 7 in which the heating energy is in the form of a blast of ignited mixture of oil with combustion air supplied the furnace by an oil burner having an oil pump and an air blower for supplying the oil and air, respectively, to such blast, the blower having an air suction inlet, the supply of such energy being established and interrupted by establishing and interrupting, respectively, the supply of oil to said blast, the means for automatically subjecting said heat sensitive element to the cooling effect of a cooling medium being constituted by means for causing a flow of air, supplied by said blower, through said chamber upon the thermostat causing said supply of heating energy to be so interrupted when the furnace temperature is above the predetermined value, and means being provided for automatically connecting said chamber to said air suction inlet of the blower for causing a flow of hot furnace gases from the interior of the furnace through said chamber when said supply of heating energy is so interrupted and the furnace temperature is above said value.

9. The combination with a furnace having means for supplying it with heating energy from an exterior source of supply, of automatically operating means for interrupting such supply upon the furnace temperature rising to above a predetermined value and for establishing such supply upon such temperature falling to below that value, said heating energy interrupting and establishing means comprising a thermostat having a heat sensitive element subjected to the furnace temperature for controlling said interrupting and establishing means to cause it so to operate; and theremostat responsive means for automatically subjecting said heat sensitive element to the cooling action of a cooling medium upon said thermostat causing said heating energy interrupting and establishing means to operate to interrupt said heating energy supply when the furnace temperature is above said value; said combination further having provided therein means forming a chamber at the exterior of the furnace and opening into its interior, said heat sensitive element of the thermostat being positioned within said chamber, said heating energy being in the form of a blast of ignited mixture of oil with combustion air and said means for supplying said heating energy being an oil burner having an oil pump and an air blower for supplying the oil and air respectively to such blast, the supply of such energy being established and interrupted by establishing and interrupting respectively the supply of oil to said blast, and said means for automatically subjecting said heat sensitive element to the cooling action of a cooling medium being constituted by means for causing a flow of air, supplied by said blower, through said chamber.

10. The combination with a furnace having means for supplying it with heating energy from an exterior source of supply, of automatically operating means for interrupting such supply upon the furnace temperature rising to above a predetermined value and for establishing such supply upon such temperature falling to below that value, said heating energy interrupting and establishing means comprising a thermostat having a heat sensitive element subjected to the furnace temperature for controlling said interrupting and establishing means to cause it so to operate; and thermostat responsive means for automatically subjecting said heat sensitive element to the heating action of a heating medium upon said thermostat causing said heating energy interrupting and establishing means to operate to establish said heating energy supply when the furnace temperature is below said predetermined value; said combination further having provided therein means forming a chamber at the exterior of the furnace and opening into its interior, said heat sensitive element of the thermostat being positioned within said chamber, said heating energy being in the form of a blast of ignited mixture of oil with combustion air and said means for supplying said heating energy being an oil burner having an oil pump and an air blower for supplying the oil and air respectively to such blast, the supply of such energy being established and interrupted by establishing and interrupting respectively the supply of oil to said blast, and said means for automatically subjecting said heat sensitive element to the heating action of a heating medium comprising a tubular conduit communicating between said thermostat-containing exterior chamber and the negative-pressure side of said air blower of the oil burner, an electrically operable valve in said conduit openable to establish and closeable to shut off communication via said conduit between said chamber and said negative-pressure side of said blower, and circuit means for said valve and controlled by said heat sensitive element of the chamber-contained thermostat whereby when said thermostat heat-sensitive element causes the heating energy interrupting and establishing means to operate to establish the heating energy supply upon falling of the furnace temperature to below the predetermined value said conduit valve is opened in response to said thermostat heat-sensitive element thereby to cause an expedited advance flow of hot furnace gases from the furnace into and through said exterior chamber under the influence of the negative-pressure side of said blower for anticipatorily conditioning said thermostat heat-sensitive element for heating energy interrupting action substantially immediately at arrival of temperature in the furnace at the predetermined value above which further rise is not desired.

References Cited in the file of this patent
UNITED STATES PATENTS

| | | |
|---|---|---|
| Re. 16,444 | Fesler | Oct. 26, 1926 |
| 1,207,537 | Gilbert | Dec. 5, 1916 |
| 1,664,339 | Williams | Mar. 27, 1928 |
| 1,812,722 | Spencer | June 30, 1931 |
| 1,931,906 | Smith | Oct. 24, 1933 |
| 2,191,640 | Beveridge | Feb. 27, 1940 |
| 2,400,052 | Lingen et al. | Apr. 20, 1948 |